United States Patent [19]
Miller

[11] Patent Number: 5,896,809
[45] Date of Patent: Apr. 27, 1999

[54] FOOD PROCESSING SYSTEM WITH AUTOMATIC UNLOADING AND OPTIONAL RACK-OFF

[75] Inventor: Randall L. Miller, Madison, Wis.

[73] Assignee: DEC International, Inc., Madison, Wis.

[21] Appl. No.: 08/883,203

[22] Filed: Jun. 26, 1997

[51] Int. Cl.⁶ .............................. A23L 1/01; A22C 15/00; B65G 17/00

[52] U.S. Cl. ........................... 99/355; 99/386; 99/443 C; 414/240; 414/924; 452/51; 452/182

[58] Field of Search ............................. 99/443 R, 443 C, 99/352–356, 386, 361, 473, 474, 477–479, 483, 427, 448; 426/523, 315, 502, 520; 34/210, 216; 53/253, 532, 536, 540; 126/21 A; 414/792.9, 792.4, 790.4, 790, 793.9, 794.2, 795.6, 924, 416, 797.1, 240, 152; 452/51, 182, 186; 211/113; 198/477.1, 802, 561, 603, 680, 685

[56] References Cited

U.S. PATENT DOCUMENTS

| | | | |
|---|---|---|---|
| 3,955,688 | 5/1976 | Jones | 414/792.9 |
| 3,988,875 | 11/1976 | Fay | 99/356 X |
| 4,171,739 | 10/1979 | Yamato | 99/443 C |
| 4,773,231 | 9/1988 | Wijts | 99/477 X |
| 4,807,741 | 2/1989 | Simelunas et al. | 414/790.4 |
| 4,955,794 | 9/1990 | Fluck | 414/790.4 |
| 5,012,726 | 5/1991 | Fehr et al. | 99/494 X |
| 5,085,138 | 2/1992 | Fehr et al. | 99/450.6 |
| 5,103,718 | 4/1992 | Schreiber et al. | |
| 5,244,683 | 9/1993 | Schreiber et al. | |
| 5,253,569 | 10/1993 | McFarlane et al. | |
| 5,280,748 | 1/1994 | Pardo | 99/355 X |
| 5,354,230 | 10/1994 | McFarlane et al. | |
| 5,392,696 | 2/1995 | Navarro et al. | 99/443 C |
| 5,398,598 | 3/1995 | McFarlane et al. | |
| 5,520,097 | 5/1996 | Cody et al. | 99/353 |
| 5,704,278 | 1/1998 | Cross | 99/443 R |
| 5,709,142 | 1/1998 | Nersesian | 99/443 C |

OTHER PUBLICATIONS

"Alkar Continuous Process Systems", Alkar Division of DEC International, Inc. P.O. Box 296, 105 Spring Street, Lodi, Wisconsin 53555, 1995.

Primary Examiner—Timothy F. Simone
Attorney, Agent, or Firm—Andrus, Sceales, Starke & Sawall

[57] ABSTRACT

A food processing method and system, including a continuous cooker/chiller conveyor system (24) for meat products such as hot dogs and the like, is provided with an automatic unloader (36) having a first discharge transfer mode (FIGS. 1 and 2) automatically transferring the food product (22) to an automatic transfer member (38) for conveyance to a packaging line (32, 34), and a second discharge holding mode (FIGS. 3 and 4) holding the food product (22) on rack-off discharge arms (54, 56) until manually removed. In the event of an interruption in the packaging line (32, 34), rather than automatically transferring the food product (22) from the automatic unloader (36) to the transfer member (38), a rack-off procedure is instituted and the food product (22) is manually unloaded from the automatic unloader (36) and manually transferred to a holding rack (44, 46) on a temporary basis until resumption of operation of the packaging line (32, 34). This enables food product (22) to be continuously conveyed by the continuous cooker/chiller conveyor system (24) to the unloading station (26) without interruption, even if there is an interruption in operation of the downstream packaging line (32, 34).

20 Claims, 8 Drawing Sheets

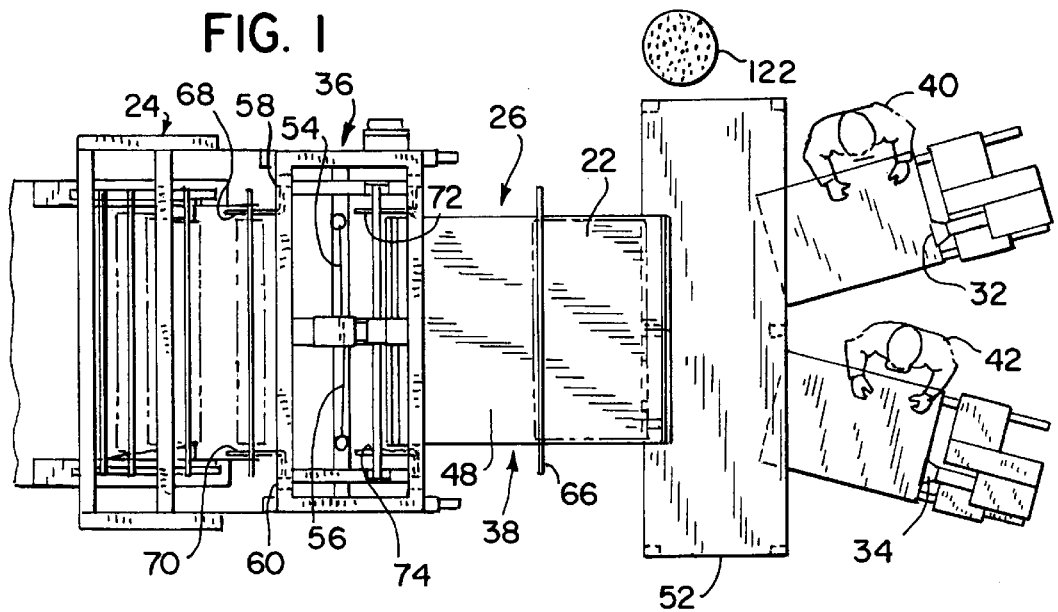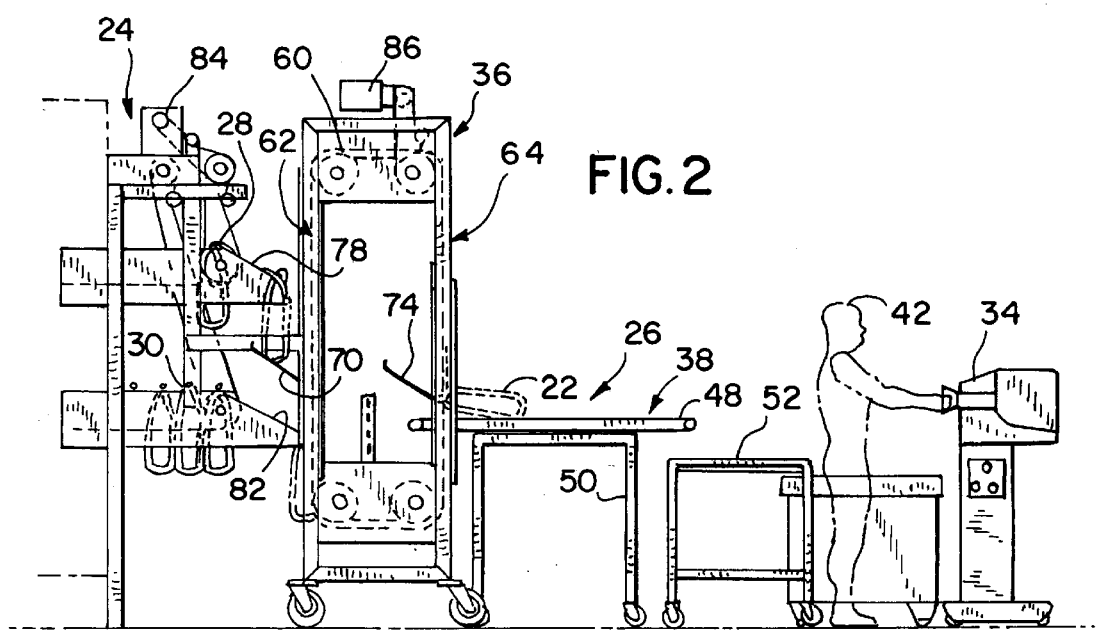

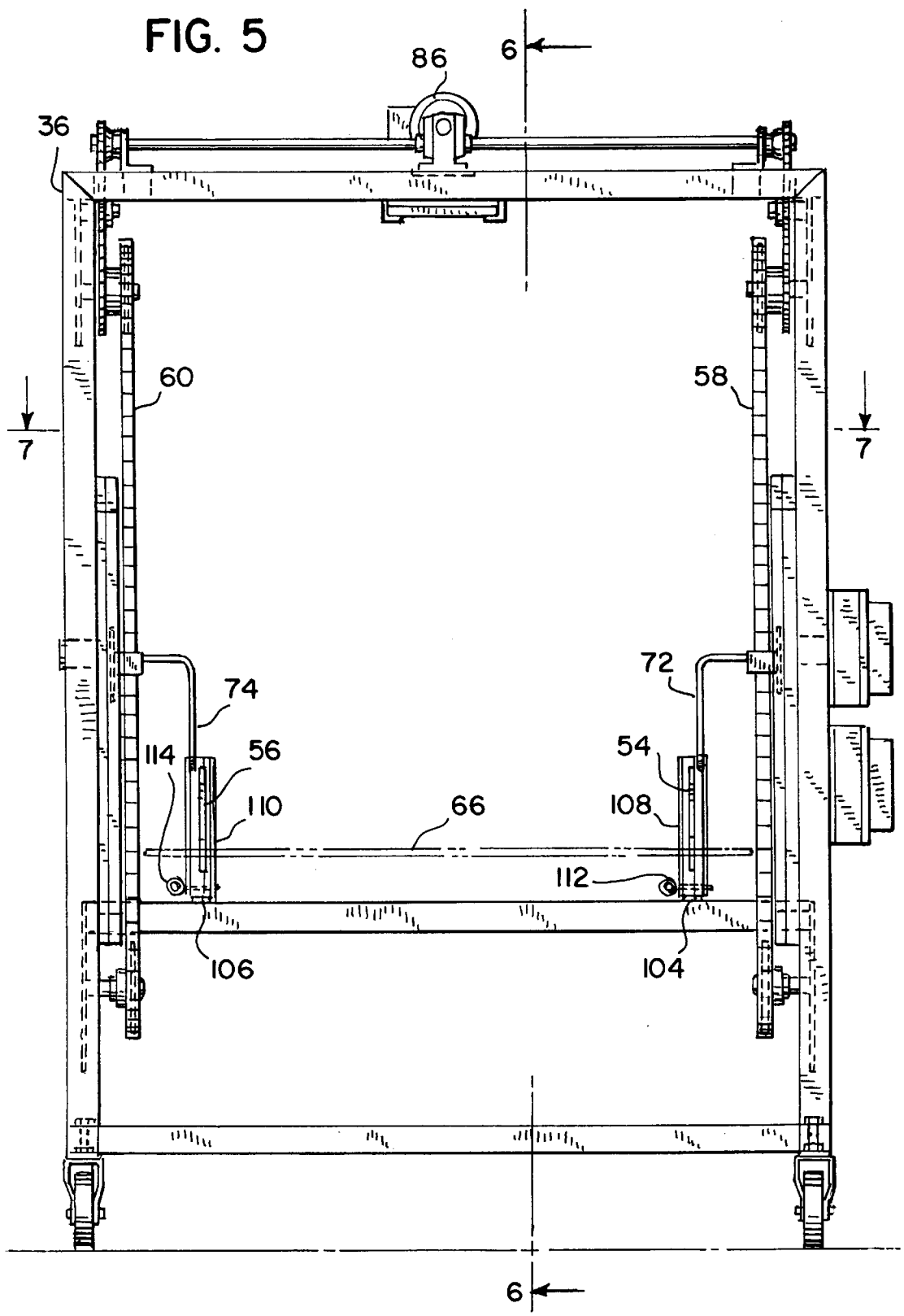

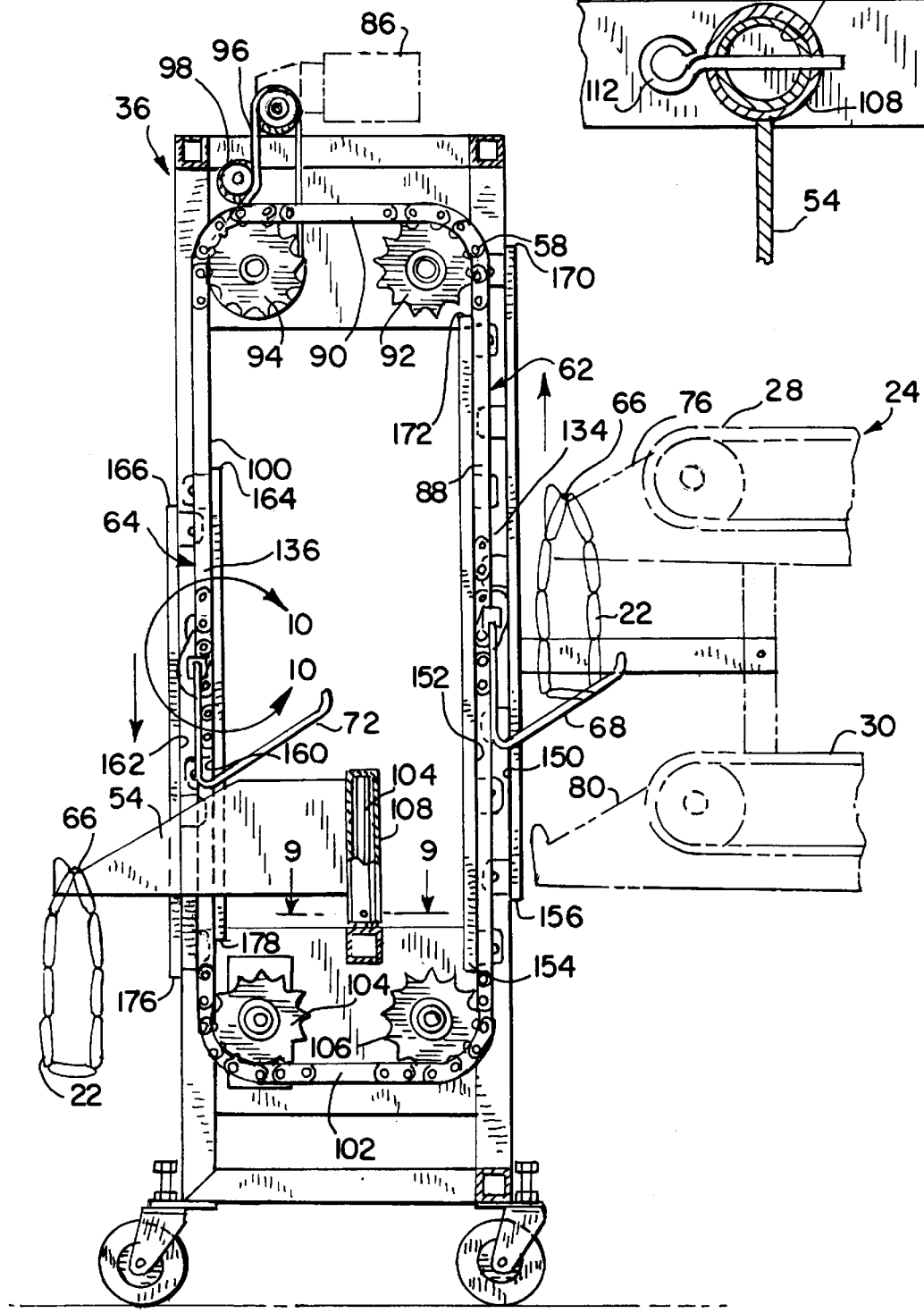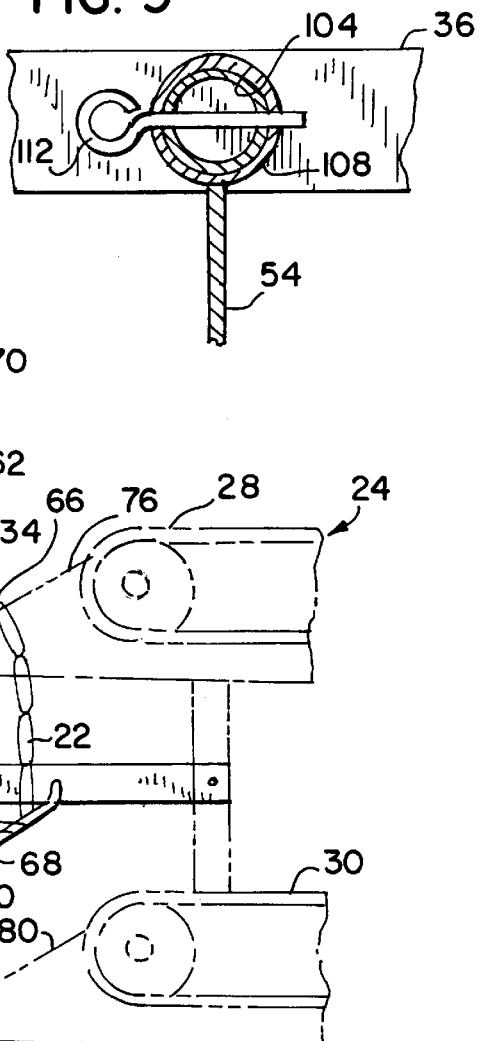

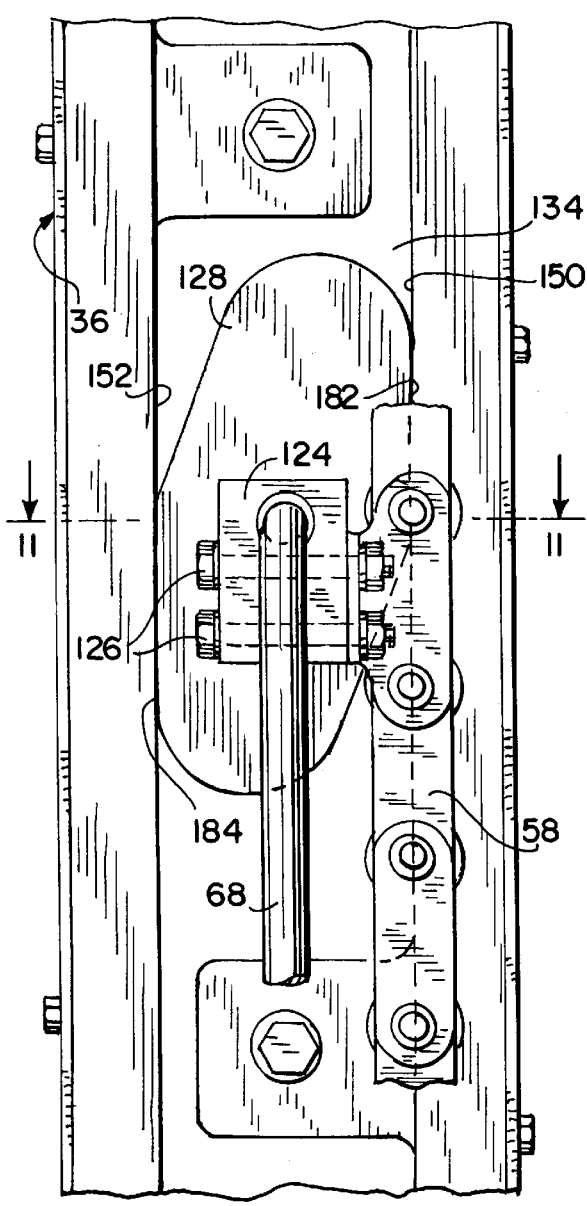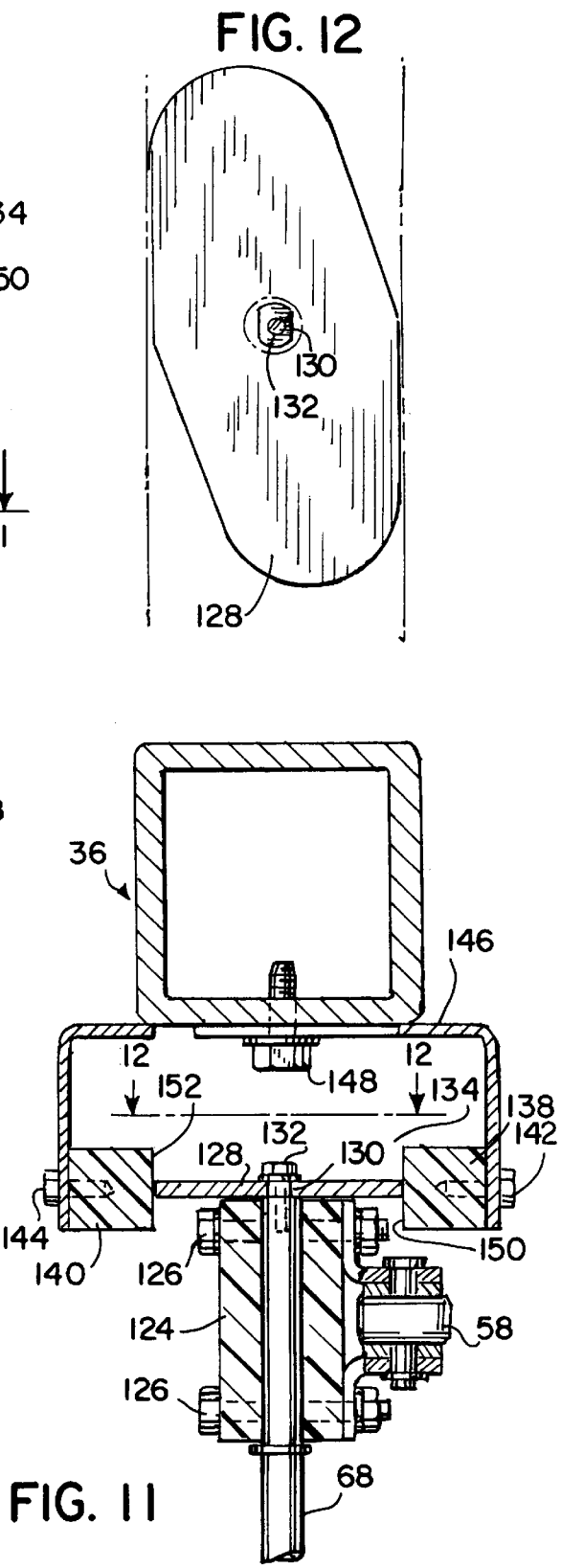

5,896,809

FOOD PROCESSING SYSTEM WITH AUTOMATIC UNLOADING AND OPTIONAL RACK-OFF

BACKGROUND OF THE INVENTION

1. Field of the Invention

The invention relates to food processing systems, including continuous cooker/chiller conveyor systems for meat products such as hot dogs, and more particularly to an automatic unloading system enabling optional manual rack-off in the event of an interruption in a downstream packaging line, and to other automatic unloader features.

2. Description of the Prior Art

In a food processing system conveying food product, including meat products such as hot dogs or the like, through a continuous cooker and/or chiller conveyor system to an unloading station, it is desired to continuously convey the food product to the unloading station without interruption, even if there is a breakdown or other interruption in operation of a packaging line downstream thereof.

SUMMARY OF THE INVENTION

The present invention addresses and solves this need, and provides an unloader having automatic and manual unload modes.

In another aspect of the invention, an unloader is provided which is particularly simple, efficient and reliable, and eliminates problems of timing relative to an adjacent upstream continuous cooker/chiller conveyor system.

In another aspect, an unload system is provided with ergonomic improvements facilitating ease of use by the operator and reducing operator effort.

BRIEF DESCRIPTION OF THE DRAWINGS

FIG. 1 is a top plan view of a food processing system in accordance with the invention.

FIG. 2 is a side view of the system of FIG. 1.

FIG. 5 is an end view of a portion of the structure of FIG. 3.

FIG. 6 is a view taken along line 6–6 of FIG. 5.

FIG. 9 is a view taken along line 9—9 of FIG. 6.

FIG. 10 is an enlarged view of a portion of the structure of FIG. 6 along line 10—10.

FIG. 11 is a view taken along line 11—11 of FIG. 10.

FIG. 12 is a view taken along line 12—12 of FIG. 11.

DETAILED DESCRIPTION OF THE PREFERRED EMBODIMENTS

Figure 3:
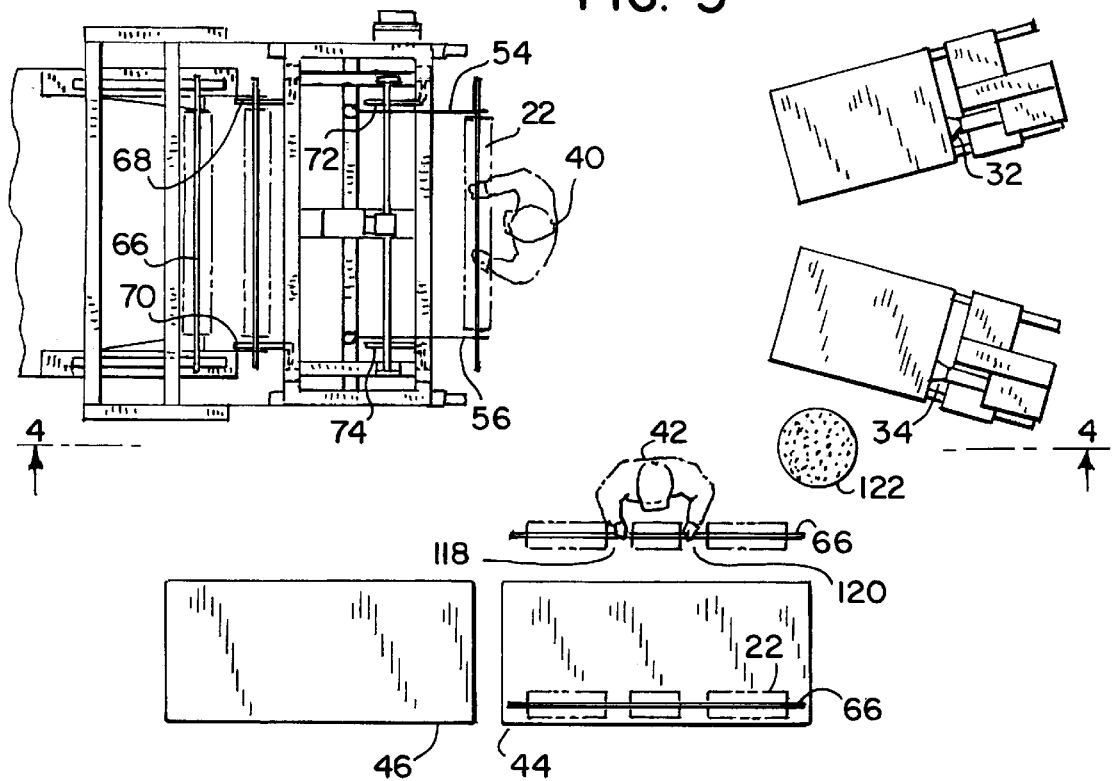
FIG. 3 is a top plan view of the system of FIG. 1 in an alternate mode of operation.
Figure 4:
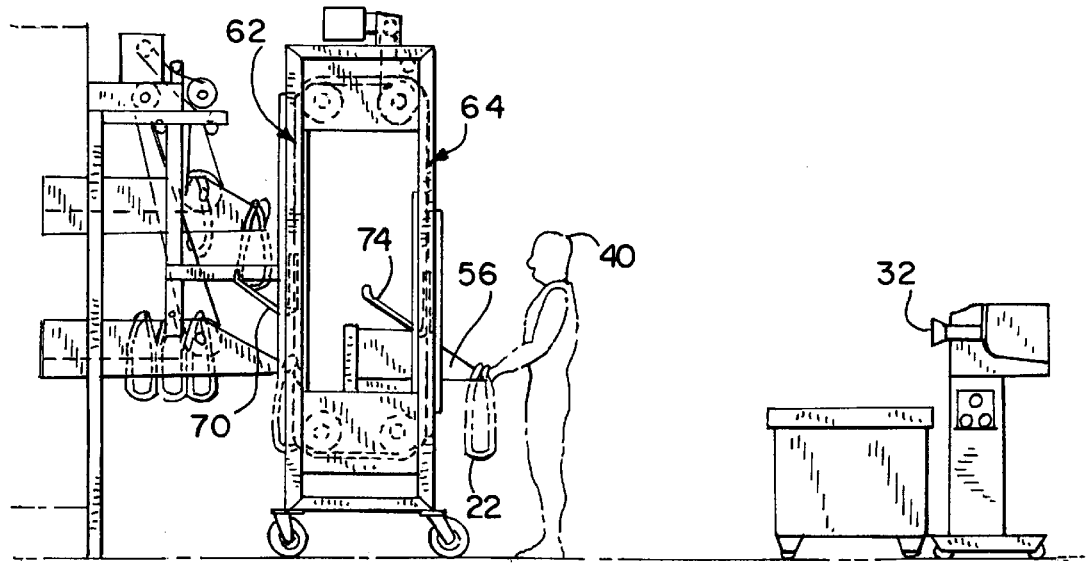
FIG. 4 is a side view of the system of FIG. 3 taken along line 4—4.

FIGS. 1 and 2 illustrate a food processing method wherein food products, for example meat such as hot dogs 22, are conveyed through a continuous cooker/chiller conveyor system 24 to an unloading station 26. The continuous cooker/chiller conveyor system 24 cooks and/or chills the food product, and is known in the prior art, for example such as manufactured by Alkar Division, DEC International, Inc., P.O. Box 296, 105 Spring Street, Lodi, Wis. 53555, and for which background further reference may be had to U.S. Pat. Nos. 5,103,718, 5,244,683, 5,253,569, 5,354,230, 5,398,598, incorporated herein by reference. In the embodiment shown, there are a pair of cooker/chiller conveyors, including a first conveyor 28, and a second conveyor 30 spaced therebelow, each carrying food product to the unloading station. It is desired to continuously convey the food product to the unloading station without interruption, even if there is an interruption in operation of a packaging line downstream thereof, for example one or more peelers 32, 34. The food product is automatically unloaded from conveyor system 24 at unloading station 26 at an automatic unloader 36, to be described. The food product is automatically transferred from automatic unloader 36 to a transfer member 38, whereafter the food product is manually unloaded by operators 40, 42 from the transfer member, and manually transferred to packaging lines, for example beginning at peelers 32, 34. In the event of an interruption in a packaging line, a rack-off procedure is instituted, FIGS. 3 and 4, wherein, instead of automatically transferring the food product from automatic unloader 36 to transfer member 38, the food product is manually unloaded from automatic unloader 36 and manually transferred to a holding rack, such as tables 44, 46, on a temporary basis until resumption of operation of the packaging line.

Transfer member 38, FIGS. 1 and 2, is provided by a portable transfer conveyor 48 on a wheeled table 50 transferring food product from unloader 36 to wheeled staging table 52, from which the food product is manually unloaded by operators 40, 42 and manually transferred to packaging lines 32, 34. The rack-off procedure is instituted by moving the transfer member away from unloader 36, by wheeling tables 50, 52 away from unloading station 26, to allow operator access to unloader 36, FIGS. 3 and 4.

Unloader 36 has a first discharge transfer mode, FIGS. 1 and 2, automatically transferring food product 22 to transfer member 38. Unloader 36 has a second discharge holding mode, FIGS. 3 and 4, holding food product 22 on rack-off discharge arms 54 and 56 until manually removed. Automatic unloader 36 is changed, to be described, from the noted first discharge transfer mode, FIGS. 1 and 2, to the noted second discharge holding mode, FIGS. 3 and 4, when there is an interruption in operation of the packaging line 32, 34. The food product 22 is then manually transferred, FIGS. 3 and 4, from rack-off discharge arms 54, 56 to holding rack 44, 46. Automatic unloader 36 is changed from the noted second discharge holding mode, FIGS. 3 and 4, back to the noted first discharge transfer mode, FIGS. 1 and 2, when operation of the packaging line 32, 34 resumes. Rack-off discharge arms 54, 56 are movable between a first position, FIGS. 1 and 8, out of the path of movement of the food product and enabling the noted first discharge transfer mode, FIGS. 1, 2 and 8, automatically transferring the food product to transfer member 38, and a second position, FIGS. 3, 4 and 7, in the path of movement of the food product, and providing the noted second discharge holding mode, FIGS. 3, 4 and 7, holding the food product on discharge arms 54, 56 until manually removed, FIG. 4. Discharge arms 54, 56 are moved from the noted first position, FIGS. 1 and 8, to the noted second position, FIGS. 3 and 7, when there is an interruption in operation of the packaging line 32, 34. In the noted second discharge holding mode, the food product is manually transferred from discharge arms 54, 56 to holding rack 44, 46, FIGS. 3 and 4. Discharge arms 54, 56 are moved from the noted second position, FIGS. 3 and 7, to the noted first position, FIGS. 1 and 8, when operation of the packaging line 32, 34 resumes. In the noted first discharge transfer mode, the food product is automatically transferred to transfer member 38, FIGS. 1 and 2, to be described.

Automatic unloader 36 includes an unload conveyor provided by a pair of spaced chains 58 and 60, FIGS. 1, 2, 5 and 6, having a pick-up side 62, FIGS. 2 and 6, facing cooker/chiller conveyors 28, 30, and picking up food product therefrom, and having a drop-off side 64 discharging the food product. Transfer member 38 has a first position, FIGS. 1 and 2, facing drop-off side 64 of automatic unloader 36 and receiving discharged food product 22 therefrom and transferring the food product to a downstream station, as at staging table 52. Transfer member 38 has a second position moved away from drop-off side 64 of automatic unloader 36, facilitating access to drop-off side 64 by operator 40, FIGS. 3 and 4.

Food product 22, such as a string of hot dogs, FIG. 6, is suspended from a food stick 66, such as a meat stick, conveyed by cooker/chiller conveyors 28, 30, as is known. The unload conveyor provided by chains 58, 60 includes a first pair of upwardly facing hooks 68 and 70, and a second pair of upwardly facing hooks 72 and 74. The hooks face upwardly and move upwardly at pick-up side 62 and engage and lift food stick 66. The hooks face upwardly and move downwardly at drop-off side 64 and disengage food stick 66 as the hooks move downwardly past and below the food stick when the food product is discharged to transfer member 38, FIG. 2, when transfer member 38 and discharge arms 54, 56 are in their noted first positions, respectively, FIGS. 1, 2 and 8. The hooks also disengage food stick 66 and move downwardly past and below the food stick when the food product is discharged to rack-off discharge arms 54, 56 when discharge arms 54, 56 and transfer member 38 are in their noted second positions, respectively, FIGS. 3, 4 and 7.

Figure 13:
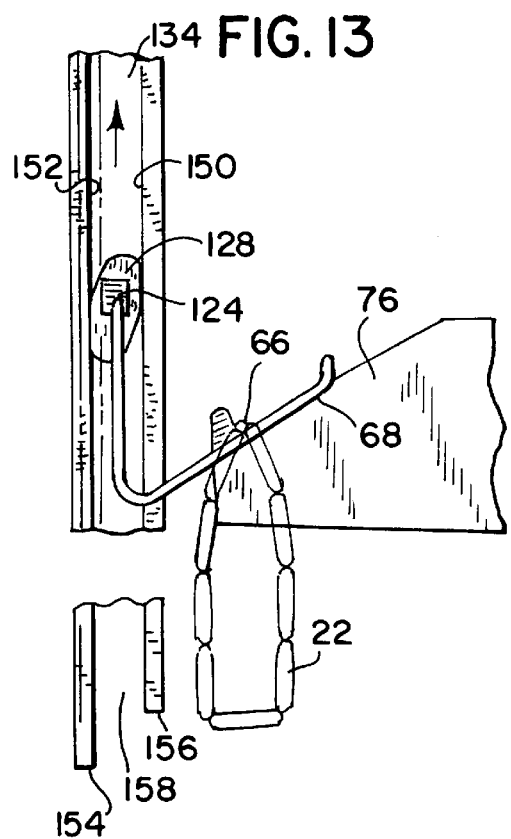
FIG. 13 is a view of a portion of the structure of FIG. 6.
Figure 14:
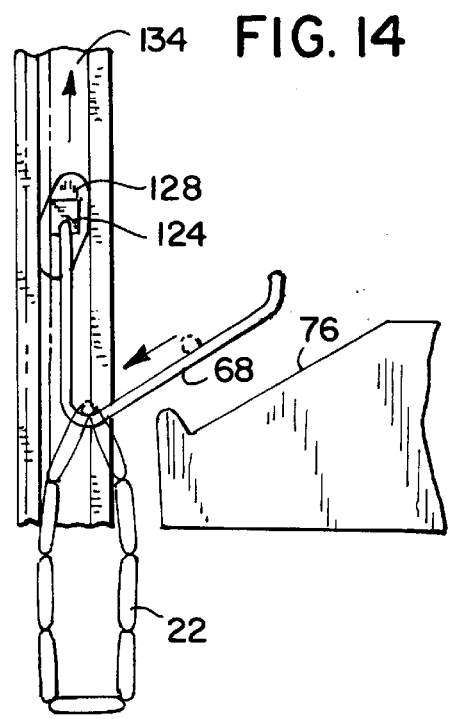
FIG. 14 is a view like FIG. 13 and illustrates further sequential operation.

A first pair of ramps 76, 78, FIGS. 6 and 2, are provided on the cooker/chiller conveyor system and extend between cooker/chiller conveyor 28 and pick-up side 62 of the unload conveyor and slant downwardly from the former towards the latter and engage food stick 66 such that the food stick is discharged from cooker/chiller conveyor and slides downwardly along ramps 76, 78 to a pick-up position, FIGS. 6 and 2, to be engaged by hooks 68, 70, FIGS. 13 and 14. A second pair of ramps are provided by discharge arms 54, 56 in the noted second position, FIGS. 7, 6 and 4, such ramps being slanted downwardly and away from drop-off side 64 of the unload conveyor and receiving food stick 66 as the hooks move downwardly therepast, FIGS. 19 and 20. As noted above, a second cooker/chiller conveyor 30 is spaced below first cooker/chiller conveyor 28 and carries food product to the unloading station. A third pair of ramps 80 and 82, FIGS. 6 and 2, is provided below the first pair of ramps 76, 78 and extends from cooker/chiller conveyor 30 downwardly and toward pick-up side 62 of the unload conveyor. Ramps 80, 82 extend further toward pick-up side 62 of the unload conveyor than ramps 76, 78, such that the same pair of hooks such as 68 and 70 can pick up a food stick from each pair of ramps if a food stick happens to be present at the downward end of each pair during an upward pass of the hooks. In this manner, timing is not critical. In typical operation, a food stick is discharged from each of conveyors 28 and 30 every thirty seconds, thus feeding four sticks per minute to the downstream packaging lines. The operating speed of chains 58, 60 is about thirty to forty feet per minute. The staggered length of ramp pairs 76, 78 and 80, 82 provides clearance between the pick-up points without interference therebetween. Conveyor speeds may be varied by varying respective drive motors 84 and 86 driving the respective drive sprocket assemblies of cooker/chiller conveyor 24 and unloader 36.

The unload conveyor of unloader 36 has an upward run 88, FIG. 6, at pick-up side 62 facing toward cooker/chiller conveyor 24 and picking up food product 22 therefrom and carrying the food product upwardly therefrom. The unload conveyor has an outgoing transfer run 90 around driven socket 92 and drive socket 94 driven by motor 86 by drive belt 96 tensioned by idler pulley 98. The unload conveyor at outgoing transfer run 90 traverses leftwardly in FIG. 6 and extends from upward run 88 and carries the food product in a direction away from cooker/chiller conveyor 24. The unload conveyor has a downward run 100 extending from outgoing transfer run 90 and carrying food product downwardly at drop-off side 64 facing away from cooker/chiller conveyor 24. The unload conveyor has a return run 102 traversing rightwardly in FIG. 6 and extending around driven sockets 104 and 106 and extending from downward run 100 back to upward run 88. Each of the noted hooks 68, 70, 72, 74 faces upwardly during upward run 88 and moves upwardly during upward run 88 and picks up food product 22. Each hook faces upwardly during downward run 100 and moves downwardly during downward run 100 and drops off the food product.

A drop-off discharge member is provided at downward run 100 to stop downward movement of the food product, and the hooks continue to move downwardly therepast, to discharge the food product. In the noted first discharge transfer mode, the drop-off discharge member is provided by portable conveyor 48 of transfer member 38 engaged by food product 22, whereafter the hooks move downwardly therepast, and the food product is transported by conveyor 48 to staging table 52. In the noted second discharge holding mode, the drop-off discharge member is provided by rack-off discharge arms 54, 56 stopping downward movement of food product 22 by engaging food stick 66, whereafter the hooks continue to move downwardly therepast, to discharge the food product. In this manner, the drop-off discharge member is selected from the group consisting of: A) transfer member 38 provided by portable transfer conveyor 48 having a first position, FIGS. 1 and 2, in the path of movement of the food product and receiving the food product and carrying same away from drop-off side 64 of unloader 36, and a second position moved away from drop-off side 64 and out of the path of movement of the food product, FIGS. 3 and 4; and B) rack-off discharge arms 54, 56 having a first position, FIGS. 1, 2 and 8, out of the path of movement of the food product, and a second position, FIGS. 3, 4, 7, 6, in the path of movement of the food product and receiving the food product and holding same. Discharge arms 54, 56 are in their noted first position when transfer member 38 is in its noted first position. Discharge arms 54, 56 are in their noted second position when transfer member 38 is in its noted second position.

The unload conveyor is provided by the noted pair of spaced continuous chains 58, 60. Each chain has one or more hooks thereon, for example hooks 68 and 72 on chain 58, and hooks 70 and 74 on chain 60. Food product 22 hangs from food stick 66 extending between and hanging from a respective pair of hooks, for example hook pair 68 and 70, and hook pair 72 and 74, such that food product 22 is suspended in the space between chains 58 and 60.

Discharge arms 54, 56 are pivotably mounted to unloader 36 at respective vertically extending bosses 104, 106, FIGS. 5, 6 and 9, receiving respective cylindrical sleeves 108, 110 of arms 54, 56. Arms 54, 56 pivot 90° about a vertical axis between the noted first position, FIGS. 1, 2 and 8, out of the path of movement of the food product, and the noted second position, FIGS. 3, 4, 6, 7, in the path of movement of the food product, and the noted 64 of unloader 36 and engaged by food stick 66 during downward run 100 to stop downward movement of the food product, wherein the hooks continue to move downwardly therepast, to discharge the food product, FIGS. 19 and 20. Discharge arms 54, 56 are overlapped in the noted first position, FIG. 8. A pair of releasable locking members 112, 114, FIGS. 5 and 9, releasably lock discharge arms 54, 56 in the noted second position, FIGS. 7, 6, 9. As shown in FIG. 9, the locking member is provided by a pin as shown at 112 extending through aligned apertures in boss 104 and sleeve 108 when the respective discharge arm 54 is in the noted second position, FIG. 6. To pivot discharge arms 54, 56 by 90° to the noted first position, pins 112, 114 are removed, and the discharge arms are pivoted about the vertical axis provided by bosses 104, 106, to the position shown in FIG. 8. Another set of aligned apertures may be provided in bosses 104 and 106 for such 90° rotated position if it is desired to lock discharge arms 54 and 56 in the position shown in FIG. 8 by reinserting pins 112, 114.

Figure 7:
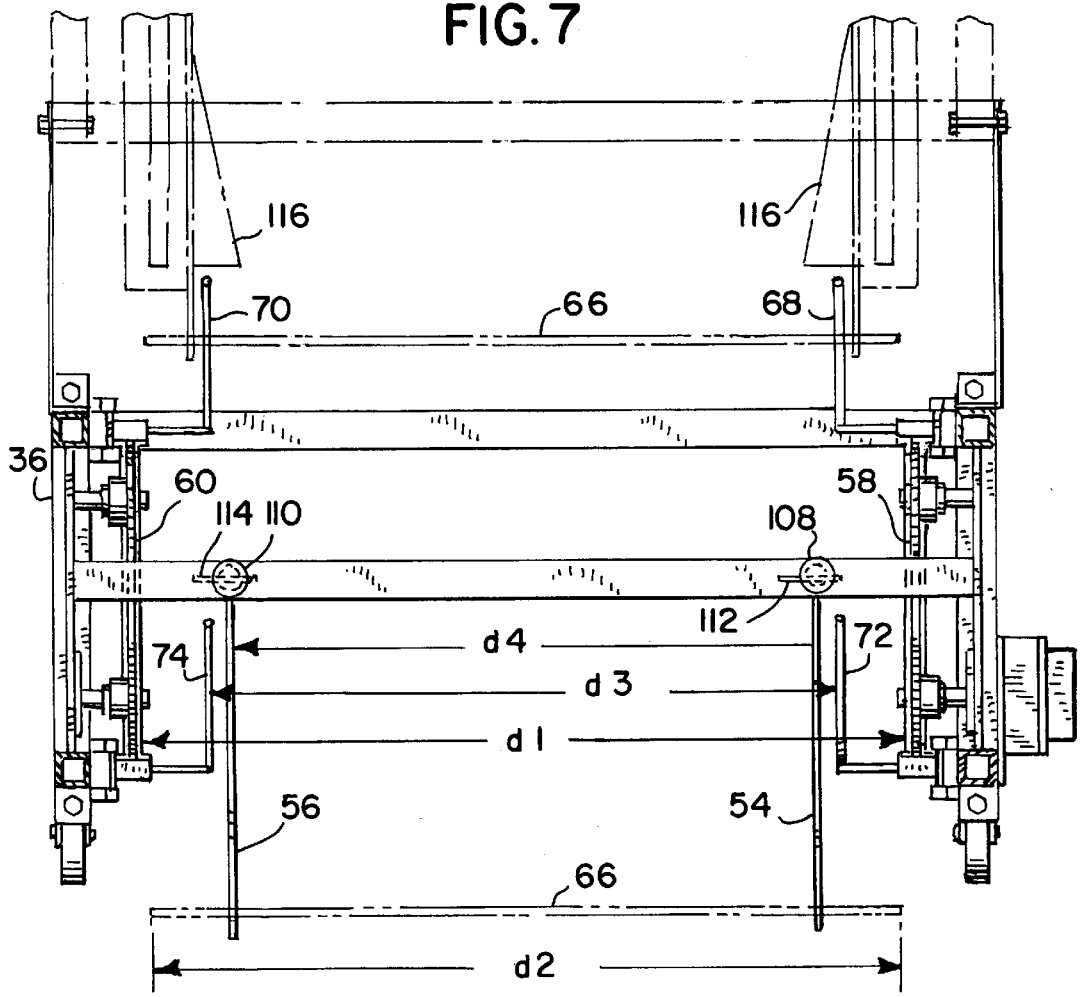
FIG. 7 is a view taken along line 7—7 of FIG. 5.
Figure 8:
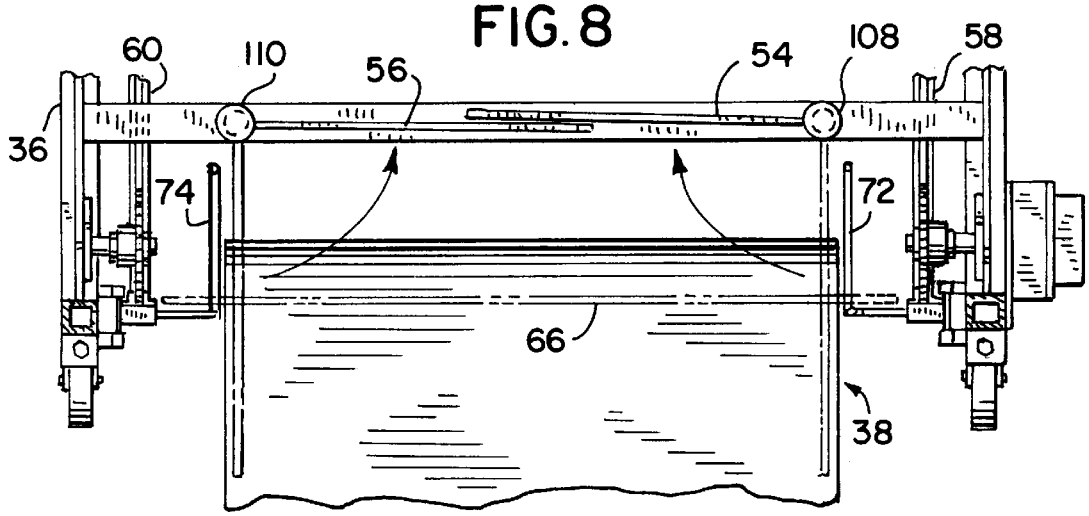
FIG. 8 is a view of a portion of the structure of FIG. 7 in an alternate mode of operation.

Chains 58 and 60 are spaced by a distance d1, FIG. 7. Food stick 66 has a length d2. Hooks 72, 74 are spaced by a distance d3. Discharge arms 54, 56 in the noted second position are spaced by a distance d4. As shown in FIG. 7, d1>d2>d3>d4. A crowder 116, FIG. 7, is provided at cooker/chiller conveyor 24 crowding food product 22 along food stick 66 to a span less than d4. A meat stick typically carries about thirty strings of hot dogs having an initial lateral span upstream of crowder 116 of about fifty six inches. Crowder 116 crowds such span to about forty eight inches. During the manual rack-off procedure, the operator may create gaps such as 118, 120, FIG. 3, between hot dog strings, in order to place his hands for carrying meat stick 66. During such rack-off procedure, it is preferred that meat stick 66 remain with the strings of hot dogs, though alternatively the meat stick can be removed therefrom and placed in stick bin 122.

Figure 15:
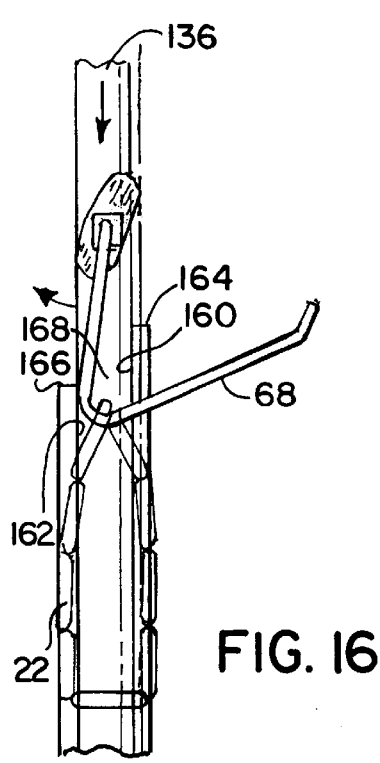
FIG. 15 is a view of a portion of the structure of FIG. 6, and illustrates further sequential operation.
Figure 16:
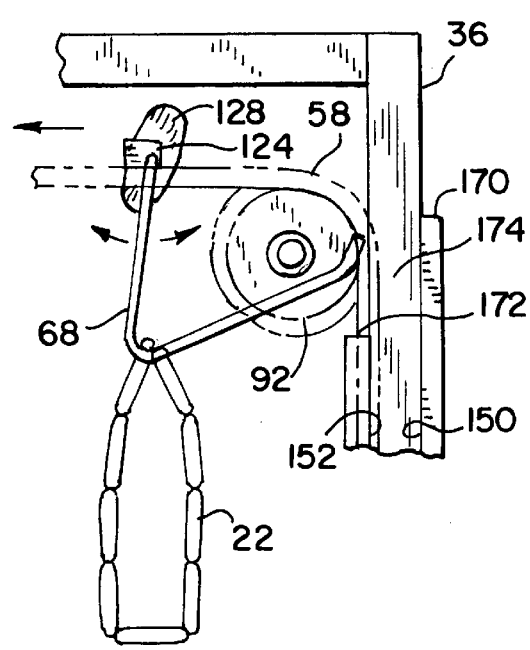
FIG. 16 is a view of a portion of the structure of FIG. 6, and illustrates further sequential operation.
Figure 17:
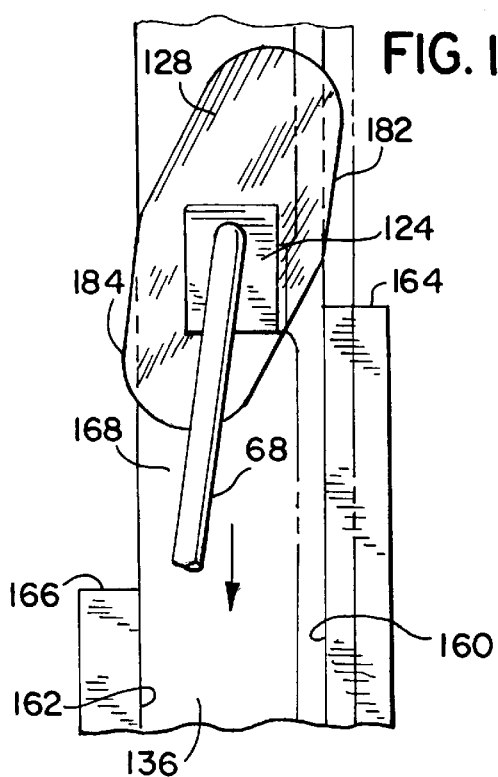
FIG. 17 is an enlarged view of a portion of the structure of FIG. 16.

Each hook, for example 68, FIGS. 10 and 11, is suspended from a respective chain such as 58 by a support block 124. The support block is bolted to the chain by bolts such as 126. Hook 68 is rotatable in block 124. Hook 68 is nonrotatably attached to a cam 128 at keyed flat spot 130 and bolt 132. Unloader 36 has a cam guide channel 134, FIGS. 6 and 10, along upward run 88, and a cam guide channel 136 along downward run 100. Each cam guide channel allows a respective cam such as 128 to slide therealong, but prevents pivoting of the cam, to in turn maintain the respective hook such as 68 in an upwardly facing position, FIGS. 6, 13, 14, 19, 20. Each cam guide channel such as 134 is provided between a pair of low friction guide blocks 138, 140, FIG. 11, bolted by respective bolts 142, 144 to a U-shaped channel member 146 bolted by bolt 148 to the frame of unloader 36. Outgoing transfer run 90, FIG. 6, and return run 102 do not have cam guide channels, and cam 128 is free to pivot during such runs, FIG. 15.

Cam guide channel 134 along upward run 88 has front and back vertical walls 150 and 152 trapping cam 128 in sliding relation therebetween. Back wall 152, FIGS. 6 and 13, has a lower end 154 below the lower end 156 of front wall 150 to provide a differential entrance opening 158 to cam guide channel 134, such that during upward run 88 cam 128 initially engages back wall 152 and is tilted thereby to an upright position of hook 68, followed by engagement of cam 128 by front wall 150 to trap cam 128 in cam guide channel 134 and maintain hook 68 in an upright position. During rightward movement in FIG. 6 along lower return run 102, cam 128 rocks or pivots slightly clockwise about central attachment point 132 due to the rightward extension of hook 68 seeking its center of gravity as suspended from attachment point 132. Thus, prior to entrance into cam guide channel 134, it is desired that cam 128 be tilted slightly counterclockwise, FIG. 13, to set hook 68 in an upright position for optimally receiving meat stick 66.

Figure 18:
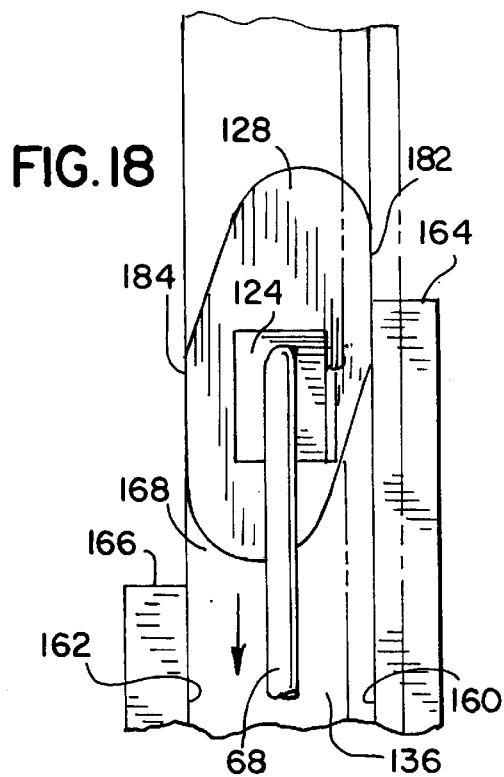
FIG. 18 is a view like FIG. 17 and illustrates further sequential operation.
Figure 19:
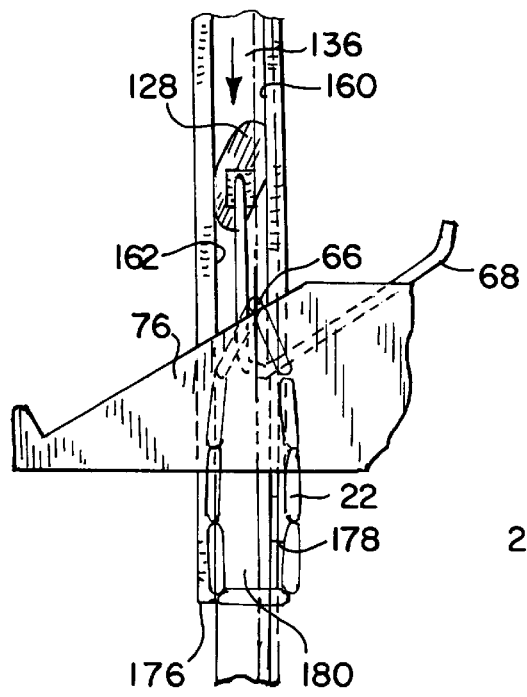
FIG. 19 is a view like FIG. 16 and illustrates further sequential operation.
Figure 20:
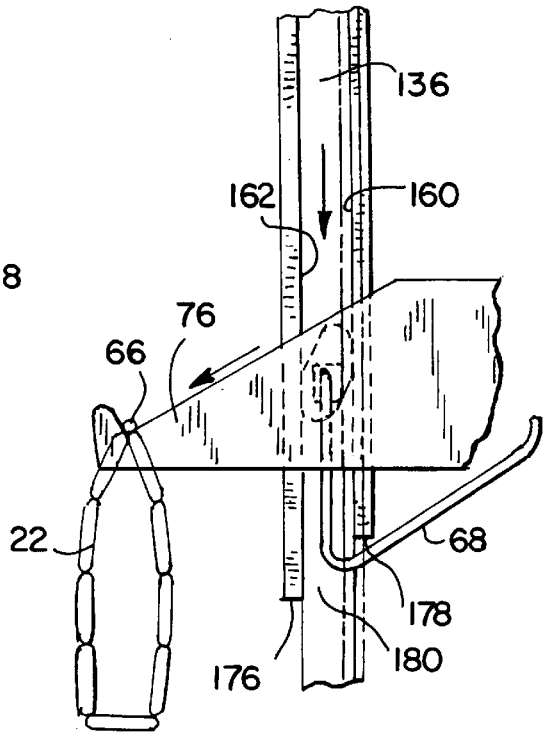
FIG. 20 is a view like FIG. 19 and illustrates further sequential operation.

Cam guide channel 136, FIGS. 16–20, along downward run 100 has front and back vertical walls 160 and 162 trapping cam 128 in sliding relation therebetween, FIGS. 18–20. Front wall 160 of cam guide channel 136 has an upper end 164 above the upper end 166 of back wall 162 to provide a differential entrance opening 168 to cam guide channel 136, such that during downward run 100 cam 128 initially engages front wall 160 of cam guide channel 136 and is tilted counterclockwise thereby, FIGS. 17 and 18, to an upright position of hook 68, FIG. 18, followed by engagement of cam 128 by back wall 162 of cam guide channel 136, FIG. 19, to trap cam 128 in cam guide channel 136 and maintain hook 68 in an upright position to better facilitate discharge of food stick 66 when the latter is stopped by discharge arms 54, 56 during downward run 100 and as hooks 68, 70 continue to move downwardly therepast, FIGS. 19 and 20.

It has been found desirable to additionally provide differential exit openings from the cam guide channels, to allow gradual beginning of the tilting of the hooks for runs 90 and 102. Front wall 150 of cam guide channel 134 along upward run 88 has an upper end 170, FIGS. 6 and 15 above the upper end 172 of back wall 152 of cam guide channel 136 to provide a differential exit opening 174 from cam guide channel 134. Back wall 162 of cam guide channel 136 has a lower end 176, FIGS. 6, 19 and 20, below the lower end 178 of front wall 160 of cam guide channel 136 to provide a differential exit opening 180 from cam guide channel 136.

Hook 68 is nonrotatably attached as above described to cam 128 at a central portion of the latter at bolt 132. Cam 128 has first and second flat surfaces 182 and 184 on distally opposite sides of the point of attachment 132 of hook 68. Cam guide channels 134, 136 have the noted front and back walls engaging flat surfaces 182, 184. During upward run 88, second flat surface 184 of cam 128 is engaged by back wall 152 of cam guide channel 134 prior to engagement of first flat surface 182 of cam 128 by front wall 150 of cam guide channel 134. During downward run 100, first flat surface 182 of cam 128 is engaged by front wall 160 of cam guide channel 136 prior to engagement of second flat surface 184 of cam 128 by back wall 162 of cam guide channel 136. Front wall 150 of cam guide channel 134 is, substantially the same length as back wall 152 of cam guide channel 134 but offset thereabove. Front wall 160 of cam guide channel 136 is substantially the same length as back wall 162 of cam guide channel 136 but offset thereabove.

It is recognized that various equivalents, alternatives and modifications may be possible within the scope of the appended claims.

The invention claimed is:

1. In a food processing system having a cooker/chiller conveyor carrying food product to an unloading station, an automatic unloader unloading said food product from said cooker/chiller conveyor at said unloading station, comprising an unload conveyor having an upward run at a pick-up side facing toward said cooker/chiller conveyor and picking up said food product therefrom and carrying said food product upwardly therefrom, an outgoing transfer run extending from said upward run and carrying said food product away from said cooker/chiller conveyor, a downward run extending from said outgoing transfer run and carrying said food product downwardly at a drop-off side facing away from said cooker/chiller conveyor, and a return run extending from said downward run back to said upward run.

2. The unloader according to claim 1 comprising a hook on said unload conveyor and facing upwardly during said upward run and moving upwardly during said upward run and picking up said food product, said hook facing upwardly during said downward run and moving downwardly during said downward run and dropping off said food product.

3. The unloader according to claim 2 comprising a drop-off discharge member at said downward run and stopping downward movement of said food product, wherein said hook continues to move downwardly therepast, to discharge said food product.

4. The unloader according to claim 3, wherein said drop-off discharge member is selected from the group consisting of:

A) a transfer member having a first position in the path of movement of said food product and receiving said food product and carrying same away from said drop-off side, and a second position moved away from said drop-off side and out of the path of movement of said food product; and B) a discharge arm having a first position out of the path of movement of said food product, and a second position in the path of movement of said food product and receiving said food product and holding same.

5. The unloader according to claim 4 wherein said discharge arm is in its said first position when said transfer member is in its said first position, and said discharge arm is in its said second position when said transfer member is in its said second position.

6. The unloader according to claim 2 wherein:

said unload conveyor comprises a pair of spaced continuous chains;

and comprising a pair of said hooks, one on each of said chains;

said food product hangs from a food stick extending between and hanging from said hooks, such that said food product is suspended in the space between said chains.

7. The unloader according to claim 6 comprising a pair of discharge arms movably mounted to said unloader, and having a first position out of the path of movement of said food product, and a second position in the path of movement of said food product at said drop-off side and engaged by said food stick during said downward run to stop downward movement of said food product, wherein said hooks continue to move downwardly therepast, to discharge said food product.

8. The unloader according to claim 7 comprising a pair of releasable locking members releasably locking said discharge arms in said second position.

9. The unloader according to claim 7 wherein said discharge arms have ramp surfaces slanted downwardly and away from said drop-off side when said discharge arms are in said second position, such that said food stick slides downwardly by gravity along said ramp surfaces and in a direction away from said drop-off side.

10. The unloader according to claim 9 wherein said discharge arms are pivoted to said unloader and pivot between said first and second positions, said discharge arms being overlapped in said first position.

11. The unloader according to claim 7 wherein:

said chains are spaced by a distance d1;

said food stick has a length d2;

said hooks are spaced by a distance d3;

said discharge arms in said second position are spaced by a distance d4;

where d1>d2>d3>d4.

12. The unloader according to claim 11 comprising a crowder at said cooker/chiller conveyor crowding said food product along said food stick to a span less than d4.

13. The unloader according to claim 6 wherein:

each said hook is suspended from a respective said chain by a support block, said hook being rotatable in said support block;

each said hook is nonrotatably attached to a respective cam;

said unload conveyor has cam guide channels along said upward run and along said downward run allowing a respective said cam to slide therealong but preventing pivoting of the cam, to in turn maintain the respective said hook in an upwardly facing position.

14. The unloader according to claim 13 wherein said cam is free to pivot during said outgoing transfer run and during said return run.

15. The unloader according to claim 13 wherein:

a first said cam guide channel along said upward run has front and back vertical walls trapping said cam in sliding relation therebetween, said back wall having a lower end below the lower end of said front wall to provide a differential entrance opening to said first cam guide channel, such that during said upward run said cam initially engages said back wall and is tilted thereby to an upright position of said hook, followed by engagement of said cam by said front wall to trap said cam in said first cam guide channel and maintain said hook in an upright position;

a second said cam guide channel along said downward run has front and back vertical walls trapping said cam in sliding relation therebetween, said front wall of said second cam guide channel having an upper end above the upper end of said back wall of said second cam guide channel to provide a differential entrance opening to said second cam guide channel, such that during said downward run said cam initially engages said front wall of said second cam guide channel and is tilted thereby to an upright position of said hook, followed by engagement of said cam by said back wall of said second cam guide channel to trap said cam in said second cam guide channel and maintain said hook in an upright position.

16. The unloader according to claim 15 wherein:

said front wall of said first cam guide channel has an upper end above the upper end of said back wall of said first cam guide channel to provide a differential exit opening from said first cam guide channel;

said back wall of said second cam guide channel has a lower end below the lower end of said front wall of said second cam guide channel to provide a differential exit opening from said second cam guide channel.

17. The unloader according to claim 13 wherein:

said hook is nonrotatably attached to said cam at a central portion of the latter;

said cam has first and second flat surfaces on distally opposite sides of the point of attachment of said hook;

said cam guide channels have front and back walls engaging said flat surfaces.

18. The unloader according to claim 17 comprising:

a first said cam guide channel along said upward run and having front and back walls trapping said cam in sliding relation therebetween;

a second said cam guide channel along said downward run and having front and back walls trapping said cam in sliding relation therebetween;

and wherein:

said first flat surface of said cam is engaged by said front walls such that said first flat surface of said cam slides along said front wall of said first cam guide channel during said upward run, and said first flat surface of said cam slides along said front wall of said second cam guide channel during said downward run;

said second flat surface of said cam is engaged by said back walls, such that said second flat surface of said cam is engaged by said back wall of said first cam guide channel during said upward run, and said second flat surface of said cam is engaged by said back wall of said second cam guide channel during said downward run.

19. The unloader according to claim 18 wherein:

during said upward run, said second flat surface of said cam is engaged by said back wall of said first cam guide channel prior to engagement of said first flat surface of said cam by said front wall of said first cam guide channel;

during said downward run, said first flat surface of said cam is engaged by said front wall of said second cam guide channel prior to engagement of said second flat surface of said cam by said back wall of said second cam guide channel.

20. The unloader according to claim 19 wherein:

said front wall of said first cam guide channel is substantially the same length as said back wall of said first cam guide channel;

said front wall of said second cam guide channel is substantially the same length as said back wall of said second cam guide channel.

* * * * *